(12) United States Patent
Morrison

(10) Patent No.: US 6,214,252 B1
(45) Date of Patent: *Apr. 10, 2001

(54) AZEOTROPE-LIKE COMPOSITIONS OF R-134A AND N-PENTANE

(75) Inventor: James David Morrison, Northwich (GB)

(73) Assignee: Imperial Chemical Industries PLC, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,433

(22) PCT Filed: Oct. 21, 1996

(86) PCT No.: PCT/GB96/02574

§ 371 Date: Apr. 30, 1998

§ 102(e) Date: Apr. 30, 1998

(87) PCT Pub. No.: WO97/16501

PCT Pub. Date: May 9, 1997

(30) Foreign Application Priority Data

Nov. 1, 1995 (GB) .................................................. 9522377

(51) Int. Cl.$^7$ ..................................................... C09K 5/04
(52) U.S. Cl. ............................ 252/67; 510/408; 62/114
(58) Field of Search ...................... 252/67, 68; 510/408; 62/114

(56) References Cited

U.S. PATENT DOCUMENTS 5,624,596 * 4/1997 Lunger et al. ......................... 252/68

FOREIGN PATENT DOCUMENTS

| 0 659 862 | 6/1995 | (EP) . |
| 1-139675 | * 6/1989 | (JP) . |
| 4-18484 | * 1/1992 | (JP) . |
| 7-252473 | * 10/1995 | (JP) . |
| 94/18282 | * 8/1994 | (WO) . |
| 94 18282 | 8/1994 | (WO) . |

OTHER PUBLICATIONS

Chemical Abstracts, vol. 124, No. 4, Jan. 22, 1996 Columbus, Ohio, US; abstract No. 33550, Sanyo Electric: "Refrigerant Compositions for Protection of Ozone Layers" XP002024171 see abstract & JP,A,07 252 473 (Sanyo Electric) see column 2, line 42 –46, Oct., 1995.

* cited by examiner

Primary Examiner—Margaret Einsmann
(74) Attorney, Agent, or Firm—Cook, Alex, McFarron, Manzo, Cummings & Mehler, Ltd.

(57) ABSTRACT

An azeotrope-like composition comprising: (A) 1,1,1,2-tetrafluoroethane and (B) n-pentane: also described is a heat transfer device comprising the azeotrope-like composition.

10 Claims, No Drawings

AZEOTROPE-LIKE COMPOSITIONS OF R-134A AND N-PENTANE

This invention relates to refrigerant compositions and to the use of such compositions in heat transfer devices such as refrigeration and air conditioning systems. The invention relates, in particular, to refrigerant compositions which can be used in the automobile air conditioning and refrigeration applications currently satisfied by dichlorodifluoromethane (refrigerant R-12).

Heat transfer devices of the mechanical compression type such as refrigerators, freezers, heat pumps and air conditioning systems are well known. In such devices a refrigerant liquid of a suitable boiling point evaporates at low pressure taking heat from a surrounding heat transfer fluid. The resulting vapour is then compressed and passes to a condenser where it condenses and gives off heat to another heat transfer fluid. The condensate is then returned through an expansion valve to the evaporator so completing the cycle. The mechanical energy required for compressing the vapour and pumping the liquid may be provided by an electric motor or an internal combustion engine.

In addition to having a suitable boiling point and a high latent heat of vaporisation, the properties preferred for a refrigerant include low toxicity, non-flammability, non-corrosivity, high stability and freedom from objectionable odour.

Hitherto, heat transfer devices have tended to use fully and partially halogenated chlorofluorocarbon refrigerants such as trichlorofluoromethane (refrigerant R-11), dichlorodifluoromethane refrigerant R-12), chlorodifluoromethane (refrigerant R-22) and the azeotropic mixture of chlorodifluoromethane and chloropentafluoroethane (refrigerant R-115); the azeotrope being refrigerant R-502, In particular. refrigerant R-12 has found widespread use in automobile air conditioning and domestic refrigeration systems.

However, the fully and partially halogenated chlorofluorocarbons have been implicated in the destruction of the earth's protective ozone layer and as a result the use and production thereof has been limited by international agreement.

Whilst heat transfer devices of the type to which the present invention relates are essentially closed systems, loss of refrigerant to the atmosphere can occur due to leakage during operation of the equipment or during maintenance procedures. It is important, therefore, to replace fully and partially halogenated chlorofluorocarbon refrigerants by materials having low or zero ozone depletion potentials.

Replacements for some of the chlorofluorocarbon refrigerants presently in use have already been developed. These replacement refrigerants tend to comprise selected hydrofluorocarbons, i.e. compounds which contain only carbon, hydrogen and fluorine atoms in their structure. Thus, refrigerant R-12 is generally being replaced by 1,1,1,2-tetrafluoroethane (R-134a).

In a heat transfer device, the refrigerant forms part of a working fluid composition which also comprises a lubricant. The lubricant circulates around the device along with the refrigerant and provides for continual lubrication of the compressor. In addition to possessing good lubricity in the presence of the refrigerant, the properties desired of a lubricant include good hydrolytic stability and good thermal stability. Moreover, in order to provide for the return of the lubricant to the compressor, the lubricant should be compatible with the refrigerant, which in practice means that the lubricant and refrigerant should possess a degree of mutual solubility, i.e. the lubricant and the refrigerant should be at least partially soluble in one another.

Hitherto, heat transfer devices have tended to use mineral oils as lubricants. The good solubility of chlorofluorocarbons with mineral oils allows the mineral oil to circulate around the heat transfer device together with the chlorofluorocarbon, and this in turn ensures effective lubrication of the compressor. Unfortunately, however, the replacement refrigerants tend to have different solubility characteristics to the chlorofluorocarbons presently in use and tend to be insufficiently soluble in mineral oils to allow the latter to be used as lubricants.

Consequently, the need to replace the chlorofluorocarbon refrigerants has presented industry with very real difficulties, since not only is there the problem of finding a viable replacement refrigerant which has the required low or zero ozone depletion potential, but also, in many cases, there is also the problem of developing a lubricant which will perform satisfactorily with the replacement refrigerant.

The present invention provides a refrigerant composition comprising a mixture of compounds having zero ozone depletion potentials which may be used together with a mineral oil or alkyl benzene type lubricant in the automobile air conditioning and refrigeration applications currently satisfied by refrigerant R-12.

According to the present invention there is provided an azeotrope-like composition for use in heat transfer devices such as automobile air conditioning and domestic refrigeration systems comprising 1,1,1,2-tetrafluoroethane (R-134a) and n-pentane.

The present invention also provides a heat transfer device, such as a refrigeration or air conditioning system, comprising an evaporator, a condenser, a compressor and an expansion valve in which there is contained an azeotrope-like refrigerant composition comprising 1,1,1,2-tetrafluoroethane and n-pentane. The composition of the invention may, in particular, be used in domestic refrigeration systems and automobile air conditioning systems.

The azeotrope-like composition of the present invention comprises 1,1,1,2-tetrafluoroethane and n-pentane. The n-pentane is capable of dissolving in mineral oil or alkyl benzene lubricants and this property may allow the composition of the invention to transport such a lubricant around a heat transfer device and return it to the compressor. As a result, heat transfer devices which employ the composition of the invention as the refrigerant may be able to employ inexpensive lubricants based on mineral oils or alkyl benzenes to lubricate the compressor.

The term azeotropic is well known in the art of refrigeration and refers to compositions comprising two or more components which exhibit constant boiling behaviour and which tend not to fractionate or separate into their constituent components upon boiling or evaporation. Thus, when an azeotropic refrigerant is employed, the liquid and vapour phases that are encountered during the refrigeration cycle tend to have identical or substantially identical compositions. The term azeotrope-like as used herein refers to compositions that behave like the true azeotrope in that they exhibit constant boiling or essentially constant boiling behaviour and tend not to fractionate to any significant degree on boiling. Thus, with an azeotrope-like composition the liquid and vapour phases that are encountered during the refrigeration cycle will also tend to have similar compositions.

The azeotrope-like compositions of the invention will preferably comprise from 95.0 to 99.9% by weight of the 1,1,1,2-tetrafluoroethane and from 0.1 to 5.0% by weight of the n-pentane. Particularly preferred compositions are those comprising from 97.0 to 99.8% by weight 1,1,1,2- tetrafluoroethane and from 0.2 to 3.0% by weight n-pentane which exhibit azeotrope-like behaviour at the temperatures and pressures which are typically encountered in automobile air conditioning and domestic refrigeration systems, i.e. temperatures in the range of from −40 to +45° C. and pressures in the range of from 0.5 to 12 bar ($0.5 \times 10^5$ N/m² to $12 \times 10^5$ N/m²).

The azeotrope-like composition of the present invention may be used to provide the desired cooling in heat transfer devices such as automobile air conditioning and domestic refrigeration systems by a method which involves condensing the composition and thereafter evaporating it in a heat exchange relationship with a heat transfer fluid to be cooled such as air or water. In particular, the azeotrope-like composition of the invention may be employed as a replacement for refrigerant R-12. The composition of the invention may also be employed as a replacement for refrigerant R-500 which is a mixture of refrigerant R-12 and 1,1-difluoroethane (R-152a) in specific proportions.

The present invention is now illustrated but not limited with reference to the following example.

EXAMPLE 1

A thermodynamic study was carried out on 1,1,1,2-tetrafluoroethane (hereinafter R-134a) and n-pentane in order to test for the existence of an azeotrope-like blend thereof. The vapour/liquid equilibrium (VLE) behaviour of a series of compositions containing R-134a and n-pentane in varying amounts was first measured. This measured VLE data was then used, together with the known properties of pure R-134a and pure n-pentane, to develop a modified Huron-Vidal (MHV-2) equation of state for the R-134a/n-pentane blend which was fitted to the measured VLE data in order to determine the various interaction parameters characterising the deviations from ideality of the blend. The resulting equation of state was then used to determine more closely the existence and composition of any azeotrope-like blends of R-134a and n-pentane at a number of different temperatures in the range of from −20° C. to +30° C. This was achieved by varying the vapour pressure and composition of the R-134a/n-pentane blend at each temperature investigated until essentially identical liquid and vapour compositions were obtained. The results are given in Table 1. For each temperature specified in Table 1, the vapour pressure and composition of the R-134a/n-pentane blend which resulted in essentially identical liquid and vapour compositions (i.e. to the first decimal place in mole %) are recorded.

TABLE 1

| Temperature | Pressure | Composition of R-134a/n-pentane blend | |
|---|---|---|---|
| (° C.) | (Bar) | Mole % | Weight % |
| −20.00 | 1.36 | 96.1/3.9 | 97.2/2.8 |
| 0.00 | 2.96 | 96.7/3.3 | 97.6/2.4 |

TABLE 1-continued

| Temperature | Pressure | Composition of R-134a/n-pentane blend | |
|---|---|---|---|
| (° C.) | (Bar) | Mole % | Weight % |
| 20.00 | 5.70 | 98.4/1.6 | 98.9/1.1 |
| 30.00 | 7.66 | 99.6/0.4 | 99.7/0.3 |

What is claimed is:

1. An azeotropic composition which exhibits azeotropic behavior at temperatures in the range of from −40 to +45° C. and pressures in the range of from 0.5 to 12 bar ($0.5 \times 10^5$ N/m² to $12 \times 10^5$ N/m²) and which consists essentially of from 97.0 to 99.8.

2. An azeotropic composition as claimed in claim 1 consisting of 97.2% by weight 1,1,1,2-tetrafluoroethane and 2.8% by weight n-pentane.

3. An azeotropic composition as claimed in claim 1 consisting of 97.0% by weight 1,1,1,2-tetrafluoroethane and 3.0% by weight n-pentane.

4. A method of providing cooling which comprises condensing a composition as claimed in any one of claims 1 to 3 and thereafter evaporating it in a heat exchange relationship with a heat transfer fluid to be cooled.

5. A method of providing cooling in an automobile air conditioning system or a domestic refrigeration system which method comprises condensing a composition as claimed in any one of claims 1 to 3 and thereafter evaporating it in a heat exchange relationship with a heat transfer fluid to be cooled.

6. A heat transfer device comprising an evaporator, a condenser, a compressor and an expansion means in which there is contained an azeotropic composition as claimed in any one of claims 1 to 3.

7. An air conditioning system or refrigeration system comprising an evaporator, a condenser, a compressor and an expansion means in which there is contained an azeotropic composition as claimed in any one of claims 1 to 3.

8. An automobile air conditioning system or a domestic refrigeration system comprising an evaporator, a condenser, a compressor and an expansion means in which there is contained an azeotropic composition as claimed in any one of claims 1 to 3.

9. A process of using an azeotropic composition as claimed in any one of claims 1 to 3 as a replacement for refrigerant R-12 in a refrigeration process which comprises condensing the azeotropic refrigerant composition and thereafter evaporating it in a heat exchange relationship with a heat transfer fluid to be cooled.

10. A process of using an azeotropic composition as claimed in any one of claims 1 to 3 as a replacement for refrigerant R-500 in a refrigeration process which comprises condensing the azeotropic refrigerant composition and thereafter evaporating it in a heat exchange relationship with a heat transfer fluid to be cooled.

* * * * *

UNITED STATES PATENT AND TRADEMARK OFFICE
CERTIFICATE OF CORRECTION

PATENT NO.   : 6,214,252 B1
DATED        : April 30, 1998
INVENTOR(S)  : James David Morrison It is certified that error appears in the above-identified patent and that said Letters Patent is hereby corrected as shown below:

Claim 1,
After "99.8", insert -- "% by weight 1, 1, 1, 2-tetrafluoroethane and from 0.2 to 3.0 % by weight n-pentane." --.

Signed and Sealed this

Sixteenth Day of April, 2002

Attest:

JAMES E. ROGAN
Director of the United States Patent and Trademark Office

Attesting Officer